US011268616B2

(12) United States Patent
Heartwell et al.

(10) Patent No.: US 11,268,616 B2
(45) Date of Patent: Mar. 8, 2022

(54) ENVELOPE GASKET

(71) Applicant: Virginia Sealing Products, Inc., Prince George, VA (US)

(72) Inventors: Timothy Meade Heartwell, Chester, VA (US); Alfred Fitzgerald Waterland, III, Chesterfield, VA (US); Jeffery William Wilson, Colonial Heights, VA (US)

(73) Assignee: Virginia Sealing Products, Inc., Prince George, VA (US)

( * ) Notice: Subject to any disclaimer, the term of this patent is extended or adjusted under 35 U.S.C. 154(b) by 232 days.

(21) Appl. No.: 16/147,936

(22) Filed: Oct. 1, 2018

(65) Prior Publication Data

US 2019/0107200 A1 Apr. 11, 2019

Related U.S. Application Data

(60) Provisional application No. 62/569,091, filed on Oct. 6, 2017.

(51) Int. Cl.
*F16J 15/10* (2006.01)
*F16J 15/12* (2006.01)

(52) U.S. Cl.
CPC ........... *F16J 15/104* (2013.01); *F16J 15/102* (2013.01); *F16J 15/108* (2013.01); *F16J 15/121* (2013.01); *F16J 15/122* (2013.01)

(58) Field of Classification Search
CPC .......... F16J 15/12; F16J 15/121; F16J 15/122; F16J 15/104; F16J 15/108
See application file for complete search history.

(56) References Cited

U.S. PATENT DOCUMENTS

| | | | | | |
|---|---|---|---|---|---|
| 1,731,404 | A | * | 10/1929 | Wetherill | G01F 1/42 138/44 |
| 2,330,106 | A | * | 9/1943 | Bernstein | F16J 15/122 428/134 |
| 2,580,546 | A | * | 1/1952 | Hobson, Jr. | F16J 15/104 277/652 |
| 2,868,575 | A | * | 1/1959 | Hawxhurst | F16J 15/104 277/652 |
| 3,031,357 | A | * | 4/1962 | Balkin | F16J 15/104 156/189 |
| 3,230,290 | A | * | 1/1966 | Nelson | B29D 99/0053 277/652 |
| 3,382,985 | A | * | 5/1968 | Muehl | F16J 15/104 210/495 |
| 3,595,589 | A | * | 7/1971 | Henderson | F16J 15/123 277/608 |

(Continued)

*Primary Examiner* — Christine M Mills
*Assistant Examiner* — L. Susmitha Koneru
(74) *Attorney, Agent, or Firm* — John H. Thomas, P.C.

(57) ABSTRACT

An envelope gasket features a bonded construction. In one example, a virgin PTFE envelope is bonded to a pair of microcellular or expanded PTFE filler material annular rings. The PTFE filler annular rings are then bonded together around a corrugated metal insert ring (on the inner and outer diameter), thus sealing inside microcellular or expanded PTFE. Alternatively, when using expanded graphite filler material annular rings, the PTFE envelope is bonded to the expanded graphite filler rings by pressure and heat, and the filler rings are bonded to each other by pressure during the bonding process.

6 Claims, 7 Drawing Sheets

(56) References Cited

U.S. PATENT DOCUMENTS

| | | | | |
|---|---|---|---|---|
| 4,540,183 A * | 9/1985 | Schneider | F16J 15/10 | 277/312 |
| 5,137,283 A * | 8/1992 | Giarrusso | F16J 15/02 | 257/E23.103 |
| 5,275,139 A * | 1/1994 | Rosenquist | F16J 15/123 | 123/193.3 |
| 5,310,197 A * | 5/1994 | Bruch | F16J 15/123 | 277/601 |
| 5,421,594 A * | 6/1995 | Becerra | F16J 15/122 | 277/608 |
| 5,536,018 A * | 7/1996 | Szott | F16J 15/104 | 277/313 |
| 5,556,113 A * | 9/1996 | Amorese | F16J 15/104 | 277/651 |
| 5,558,347 A * | 9/1996 | Nicholson | F16J 15/00 | 277/652 |
| 6,092,811 A * | 7/2000 | Bojarczuk | F16J 15/122 | 277/627 |
| 6,139,024 A * | 10/2000 | Yakushiji | F16J 15/0825 | 277/592 |
| 6,464,920 B1 * | 10/2002 | Kramer | B29C 45/16 | 264/243 |
| 6,485,809 B1 * | 11/2002 | Minor | F16J 15/104 | 428/66.4 |
| 7,455,301 B2 | 11/2008 | Ragsdale et al. | | |
| 8,066,843 B2 | 11/2011 | Ragsdale et al. | | |
| 8,382,122 B2 * | 2/2013 | Ueda | F16J 15/104 | 277/592 |
| 2005/0202233 A1 * | 9/2005 | Dove | B29C 65/5057 | 428/316.6 |
| 2006/0181032 A1 * | 8/2006 | Riggs | F16J 15/122 | 277/627 |
| 2007/0205566 A1 * | 9/2007 | Ragsdale | F16J 15/122 | 277/628 |
| 2011/0162864 A1 * | 7/2011 | Kaneda | F16J 15/064 | 174/50.59 |
| 2017/0074437 A1 * | 3/2017 | Briggs | F16L 23/003 | |
| 2017/0080631 A1 * | 3/2017 | Valle | B29C 43/003 | |
| 2018/0081400 A1 * | 3/2018 | Pandya | F16J 15/064 | |

* cited by examiner

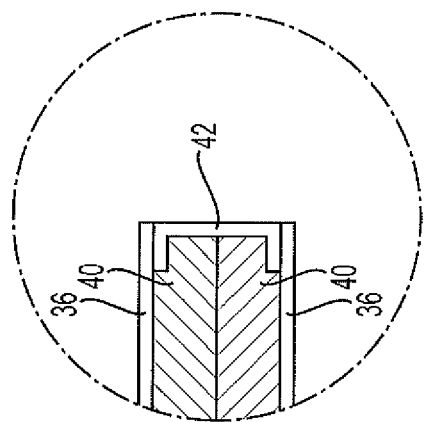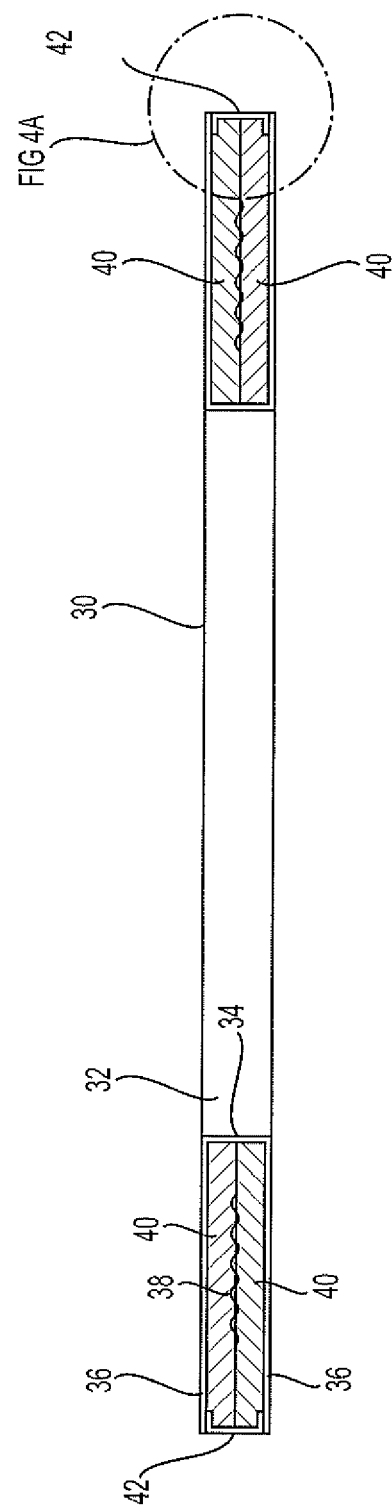

ENVELOPE GASKET

The present application claims the benefit of U.S. Provisional Patent Application No. 62/569,091, filed Oct. 6, 2017, which is incorporated by reference herein in its entirety.

The field of the invention is polytetrafluoroethylene (PTFE) envelope gaskets. Specifically, the envelope gaskets include an outer shell layer (also referred to as "envelope") that is formed around a metal insert ring and filler layers positioned on either side to the metal insert ring. The envelope is bonded/fused to the filler layers that are likewise bonded to each other isolating the metal insert.

BACKGROUND

Glass lined steel flanges are typically used with process piping and vessel flanged systems that work with corrosive materials that could otherwise degrade a simple steel pipes and flange. Unfortunately, these glass lined steel (GLS) systems have uneven and wavy surfaces that are a result of the glass coating on the steel. Polytetrafluoroethylene (PTFE) envelope gaskets are designed and used to seal these wavy glass lined steel flanges. A moderately compressible/adaptable PTFE-based gasket is required. Because of the extreme waviness that exists on these flanges, the gasket must be thicker than standard gaskets. Thick, 100% PTFE gaskets would creep too much and are not sufficiently compressible/adaptable. Envelope gaskets were developed for this application which encompass inexpensive, reasonably compressible/adaptable fillers packed inside a PTFE envelope. A corrugated insert is added to provide some "springiness". Seemingly the best of both worlds, a user gets the thicker/adaptability of the cheap filler rings chemically isolated from the process fluid when packed inside of the PTFE envelope. As long as the PTFE envelope is not compromised in any way, the filler rings do not see chemical attack and, within the thermal limits of the filler rings, the envelope gasket is generally functionally acceptable. However, this current PTFE envelope gasket sealing technology for corrosive process piping and vessel flanged systems can have performance challenges.

First, traditional PTFE envelope gaskets make installation and sealing reliability a problem. Because of the way the PTFE envelopes are made/machined/formed, the leaves (top and bottom sides) of the PTFE envelopes are loose, floppy and wavy. Loose leaves can and sometimes do fold back when fitting the gasket between flanges. When this happens, the inside filler rings are now partially or fully exposed to the process fluid which will chemically corrode the filler, reducing its thickness, causing loss of bolt load and leakage or blow-out.

Second, any PTFE envelope itself has some degree of porosity, over time allowing the process fluid to permeate through the PTFE and slowly chemically attack the filler. Also, because of the way PTFE envelopes are made/machined/formed, it is not uncommon for the PTFE envelope to have cracks or seams along the inside diameter (ID) of the gasket, allowing for permeation and leakage of process fluid through/past the envelope which again will contact and corrode the filler.

Third, the fillers for existing envelope gaskets are selected for cost and compressibility reasons, and not chemical resistance. Any corrosive exposure to the filler can compromise that material. Additionally, existing envelope gaskets typically utilize material with poor recovery as the filler layers that does not provide the gasket with any significant mechanical advantage during cyclic loadings. The filler is very often compressed, non-asbestos fiber sheet gasketing, because this material is inexpensive. This filler material is the thickest component of the envelope gasket, so as it thermally degrades or chemically degrades, the gasket can lose a significant percentage of its thickness which translates into losing most/all of the bolt load. No/low bolt load equates to leakage.

It is readily apparent that existing envelope gaskets can have significant performance limitations. Despite this, these envelope gaskets are still widely used in especially GLS flange applications.

SUMMARY

The gasket described herein was developed to solve the foregoing challenges with existing envelope gaskets. The gasket described herein utilizes traditional envelope gasket construction albeit with improved components and applies manufacturing processing that secures the virgin PTFE envelope leaves to the filler material rings. This allows encapsulation of the metal insert ring resulting in a one-piece gasket that eliminates all of the disadvantages of the traditional envelope gaskets, while maintaining the original intended functionality. With the improved gasket, a user obtains the following benefits/improvements over conventional envelope gaskets:

1) Completely Encapsulated Corrugated Metal Insert—thereby protecting the metal insert from chemical corrosion from both internal and external conditions and maintaining the mechanical integrity and "spring" properties of the insert.
2) Lower Seating Stress—because of the higher compressibility of the PTFE fillers and the design of the corrugated insert, the present gasket will adapt to and seal the wavy glass lined steel flange surfaces seal at lower gasket stress/torque than traditional PTFE envelope gaskets.
3) Easier Installation—the new gasket installs easily and reliably even between tight flanges without any possibility of the envelope leaves flaring and flopping due to the bonded one-piece construction.
4) Complete chemical inertness—the construction and components of the new gasket can provide complete chemical inertness. Any chemical permeation or weepage through the PTFE envelope, caused by a defect or cut/tear in the protective envelope, will not corrode or cause failure of any of the internal components when utilizing PTFE filler rings.

In one example, an envelope gasket comprises a corrugated metal insert, a pair of filler material annular rings, and a PTFE outer shell. The corrugated metal annular ring insert defines a first inside diameter and a first outside diameter. The polytetrafluorethylene (PTFE) outer shell is in the shape of an annular ring, defining a second inside diameter and a second outside diameter, closed at the second inside diameter and open at the second outside diameter, wherein the second inside diameter is less than the first inside diameter, and the second outside diameter is greater than the first outside diameter. A pair of filler material annular rings each define a third inside diameter and a third outside diameter, wherein the third inside diameter is less than the first inside diameter, and the third outside diameter is greater than the first outside diameter. The filler material annular rings are positioned on a top and a bottom of the corrugated metal annular ring insert, and the outer shell is positioned continuously around the filler rings and the first and third inside diameters and the first and third outside diameters. The outer shell and the filler material annular rings are bonded to each other and the filler rings are bonded to themselves at the inside of the first inside diameter and outside of the first outside diameters. The outer shell may be comprised of virgin polytetrafluoroethylene. The filler material annular rings may be comprised of a material selected from the group consisting of microcellular PTFE, expanded PTFE, filled PTFE, and expanded graphite. The overall thickness of the entire gasket may be between about 0.09 and 0.55 inches, or alternatively between about 0.18 and 0.27 inches. The envelope gasket may comprise no adhesive material between the outer shell, filler material and metal insert layers. The filler material annular rings may be comprised of expanded graphite, and the gasket may further comprise at least one winding of an expanded PTFE tape around the third outside diameter of the expanded graphite filler material and having a width at least as wide as the distance between the outer shell at the second outside diameter of the gasket, and wherein the expanded PTFE tape is bonded to the outside shell of the gasket. The gasket may further comprise a plurality of windings of expanded PTFE tape around the third outside diameter of the expanded graphite filler material, and all of the windings are bonded to the inside faces of the outside shell of the gasket.

In another example, a method of making an envelope gasket comprises the steps of providing a corrugated metal annular ring insert defining a first inside diameter and a first outside diameter and a polytetrafluoroethylene outer shell in the shape of an annular ring, defining a second inside diameter and a second outside diameter, closed at the second inside diameter and open at the second outside diameter, wherein the second inside diameter is less than the first inside diameter, and the second outside diameter is greater than the first outside diameter. Also provided are a pair of filler material annular rings, each defining a third inside diameter and a third outside diameter, wherein the third inside diameter is less than the first inside diameter, and the third outside diameter is greater than the first outside diameter, wherein the filler material annular rings are positioned on a top and a bottom of the corrugated metal annular ring insert. The outer shell is positioned continuously around the filler rings and the first and third inside diameters and the first and third outside diameters and bonded to the filler material by subjecting the assembled gasket to bonding heat and bonding pressure and for a sufficient time. The bonding heat may be in the range of about 620 degrees F. to 680 degrees F., and the bonding pressure may be about 3-75 psi of gasket stress.

BRIEF DESCRIPTION OF THE DRAWINGS

FIGS. 4A and 4B are side cross-sectional views of a second example of an envelope gasket as described herein.

DETAILED DESCRIPTION

Figure 1:
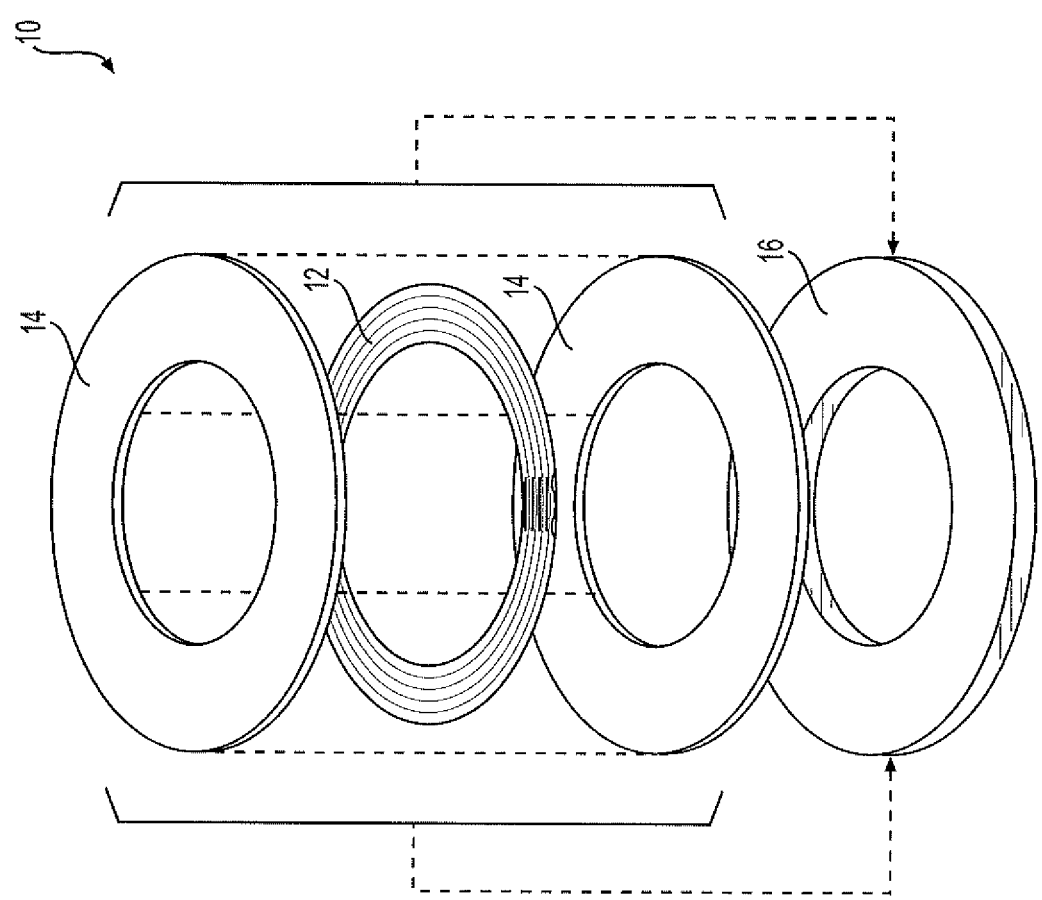
FIG. 1 is an exploded, perspective view of an example of the envelope gasket described herein.

The envelope gasket described herein features a bonded construction. In one example, a virgin PTFE envelope is bonded to a pair of microcellular or expanded PTFE filler material annular rings. The PTFE filler annular rings are then bonded together around a corrugated metal insert ring (on the inner and outer diameter), thus sealing inside microcellular or expanded PTFE. Alternatively, when using expanded graphite filler material annular rings, the PTFE envelope is bonded to the expanded graphite filler rings by heat and pressure, and the filler rings are compression bonded to each other by pressure during the bonding process.

The envelope (outer shell) material used is a full density PTFE. The outer shell may be formed of PTFE made from Grades A, B, C, D, or E of PTFE (or any combination of virgin and recycled PTFE) and will be available in a variety of envelope styles (milled, slit, bullnose), sizes/classes (to meet the piping/flange needs), densities (2.1 g/cc-2.2 g/cc), leaf thicknesses (0.018 inches-0.027 inches) and total overall thicknesses (3/32 inch-9/16 inch) to meet customer's needs. Grade A PTFE is 100% virgin PTFE material, Grade B is 70% virgin material with 30% recycled material, Grade C is a 50%-50% split of virgin material and recycled, Grade D is 30% virgin material with 30% recycled material and Grade E is 100% recycled material. The use of full density PTFE means that the outer shell has good physical properties (more incompressible (hard) due to its relatively higher density over other PTFEs), permitting a bond to microcellular or expanded PTFE fillers and also to expanded graphite. In certain applications, the envelope (outer shell) could be made from TFM PTFE, a PTFE that has a denser polymer structure giving the user lower permission (increased gasket performance).

Filler material options for a filler material annular ring include filled, microcellular or expanded PTFE, or expanded/flexible graphite and would be available in multiple sizes, densities (microcellular PTFE: 0.60 g/cc-1.5 g/cc, expanded PTFE: 0.50 g/cc-1.2 g/cc, filled PTFE: 1.6-2.5 g/cc, and flexible graphite: 1.0 g/cc-1.45 g/cc), and thicknesses (1/32 in-1/4 inch) per filler ring. The microcellular PTFE provides a user with a sponge like filler that will conform easily to damaged flanges/surfaces. It also has very small (less than 2 micro-inches) air voids that compress and allow the material to recover somewhat once unloaded. Expanded PTFE (ePTFE) utilizes a proprietary manufacturing process to create biaxial-oriented (stretched both horizontally and vertically in the x and y directions) gaskets (or sheets) with air voids. These air voids are different in their construction from those found in microcellular PTFE. The microcellular is sponge-like; whereas, the ePTFEs air voids resemble fibers. These are formed during the stretching process and create a more compressible material that significantly exhibits creep/cold flow (material flowing outward). However, ePTFE does not exhibit the degree of recovery that microcellular PTFE does.

Since most of the materials (microcellular PTFE, ePTFE, filled PTFE, and virgin PTFE) have similar temperature characteristics, they bond together during a bonding/fusing process creating a one (1) piece design instead of one (or more) of the materials melting or flowing at different rates if they had different temperature characteristics. The top and bottom portions of the gasket, if not bonded to the filler material, will flop loosely and maybe cause potentially catastrophic assembly and performance problems. In addition to microcellular PTFE and ePTFE that may be used as a filler material, expanded/flexible graphite may alternatively be used in some applications. The virgin PTFE envelope is similarly bonded/fused with the expanded graphite filler material. Flexible graphite would increase an envelope gasket's ability to resist creep/cold flow significantly more than the PTFE alternative because of the flexible graphite's carbon molecular structure. However, in some applications, the gasket with expanded graphite fillers would be ideal but cannot be used because the expanded graphite is exposed to the corrosive process environment.

To protect the expanded/flexible graphite filler, the outer diameter of the gasket can be wrapped in ePTFE membrane tape to encapsulate the expanded graphite. The ePTFE membrane tape can vary from ½-4 inches in width, 0.001-0.004 inches in thickness, and 3-10 wraps depending on the application/request. The ePTFE membrane can have a density of 0.2 to 0.8 grams/cubic centimeter. This ePTFE membrane tape is wrapped around the outside diameter of the filler material rings and can be similarly bonded to the outer shell and to the filler material during heat processing.

An envelope gasket as described herein that includes flexible graphite as a filler material would provide a user with a gasket that has the overall chemical inertness of virgin PTFE but needs to remain mechanically stable at higher temperatures (300-550 F) or under higher compressive loads (example ASME Class 300 flange loads). This composite gasket material has a higher temperature rating that allows for the virgin PTFE envelope to bond to the flexible graphite without the graphite expanding or contracting during the bonding/fusing process. As a result, uncommon sizes and shapes may be made (if requested).

Using the foregoing types of expanded, filled or microcellular PTFE allows the resulting gasket to deform into the imperfections or waviness of the flange surfaces. These imperfections could be the surface is not flat, but wavy with high spots and low spots due to how the molten glass is applied to the metal flange substrate (in GLS) or damage (cut, divots, pits, etc.) in traditional flanges (stainless, carbon steel, etc.). With the filler being extremely compressible, the gasket described herein can be used in areas/applications that traditional envelope gaskets cannot, including the following: weak flanges (such as fiberglass reinforced plastic [FRP], Teflon lined, plastic, thin flanges) or connections that do not have a lot of gasket stress available to create a seal. This type of PIPE also has a favorable dynamic response and provides more "rebound" or spring back to the gasket, which makes this favorable for applications with cyclic load (thermal) or periodic shutdowns/start-ups.

The use of expanded, filled, or microcellular PTFE as a filler material over the filler materials of traditional envelope gaskets (normally compressed fiber/non-asbestos (CNA)) is an improvement because it makes the gasket more chemically inert (allowing it to reliably work in a broad range of chemicals) even in corrosive external atmospheres or in situations where the integrity of the protective PTFE envelope is compromised. Having this level of chemical inertness over traditional envelope gaskets, which can have some degree of porosity through the body of the PTFE envelope or have cuts/seams in the envelope, is very beneficial. The existing state of the art gaskets can cause catastrophic failures to the sealing system because the internal components (fillers and metal inserts) were not designed to be in contact with the media and when in contact with that media, will begin to degrade and cause gasket/joint failure. However, the gaskets described herein include filler materials designed and selected with corrosive media and environment in mind and will not be affected by full or incidental contact with the process fluids. There is also no risk of thermal degradation and the PTFE used has higher temperature limits (fillers in traditional gaskets have a maximum long-term temperature limits of 250° F. while the gaskets described herein have limits of about 450° F.). This temperature difference is directly related to the rubber adhesive binder in CNA gasket filler materials that cook out at higher temperatures. The new gasket described herein also increases the shelf-life over the CNA envelope gaskets (traditional) from 3-5 years to indefinite.

The metal insert is typically a corrugated metal. Most commonly it will be 316 stainless steel; however, other stainless steels, carbon steels, copper, nickel, Hastelloy, or titanium can be used. The size (inner/outer diameter), thickness, pitch, and number of corrugations of the insert will vary for each application this gasket is used in. The insert will be 100% encapsulated between/within the filler(s) (microcellular, expanded PTFE, expanded/flexible graphite) allowing the insert metallurgy to not affect/hinder the gasket's compatibility with any media (if its compatible with the virgin PTFE/microcellular, expanded PTFE, or flexible graphite).

The foregoing corrugated metal annular ring insert, filler material annular rings, and PTFE outer shell are fused together to form the final envelope gasket. Once the layers are loosely assembled, this assembly is then subject to heat and pressure for a calculated time in order to bond the layers together. With respect to pressure, between 3 psi and 75 psi of gasket stress, or alternatively between 5 psi and 30 psi depending on the size and thickness of the final gasket. There must be enough pressure the bond the layers, but not too much pressure that will make the finished gasket too hard or thin. The temperature varies from 600 degrees F. to 750 degrees F., or alternatively, about 620 degrees F. to 700 degrees F., or still further alternatively about 620 degrees F. to 680 degrees F. The time of heat and pressure is variable depending on the size and thickness of the desired end gasket. In general, the time of heat and pressure is about one to 4 hours, or alternatively about one to 2.5 hours.

As explained already herein, the relative sizes of the various gasket components are important. The corrugated metal ring insert is the middle of the composite gasket. The ring insert has an annular shape to fit around a pipe and not block the flow of media through a pipe. Accordingly, the metal insert is an annular shape that defines a first inside diameter and a first outside diameter. The filler material rings are similarly annular in structure. Importantly, with one filler disk on each of the top and bottom of the metal insert ring, the insert rings define a second inside diameter and a second outside diameter. The second inside diameter is less than the first inside diameter, and the second outside diameter is greater than the first outside diameter. In this way, the filler material rings will bond to each other at the inside and outside of the metal insert. The outer shell also has an annular ring shape with a third inside diameter and a third outside diameter. The third inside diameter is less than the second inside diameter, and the third outside diameter is similar in length or greater than the second outside diameter. The top, bottom and third inside diameter of the outer shell are all an integral and monolithic piece of full density PTFE. In this way, the outer shell will wrap around the filler rings and the metal insert ring.

With all of these additions, the present gasket gives a user higher tightness (lower leakage) at lower gasket stress, better recovery, more compressibility, and outstanding chemical inertness making this an envelope gasket that has none of the drawbacks or limitations of current envelope gaskets.

Turning now to the figures, FIG. 1 is an exploded view of an envelope gasket 10 as described herein. The envelope gasket 10 includes a corrugated metal annular ring insert 12 that has a pair of filler material annular rings 14 positioned on each of the top and bottom sides of the corrugated metal annular ring. A PTFE outer shell 16, open at its outside diameter, is the envelope into which the combination of the corrugated metal annular ring insert 12 and filler material annular rings 14 are positioned.

Figure 2:
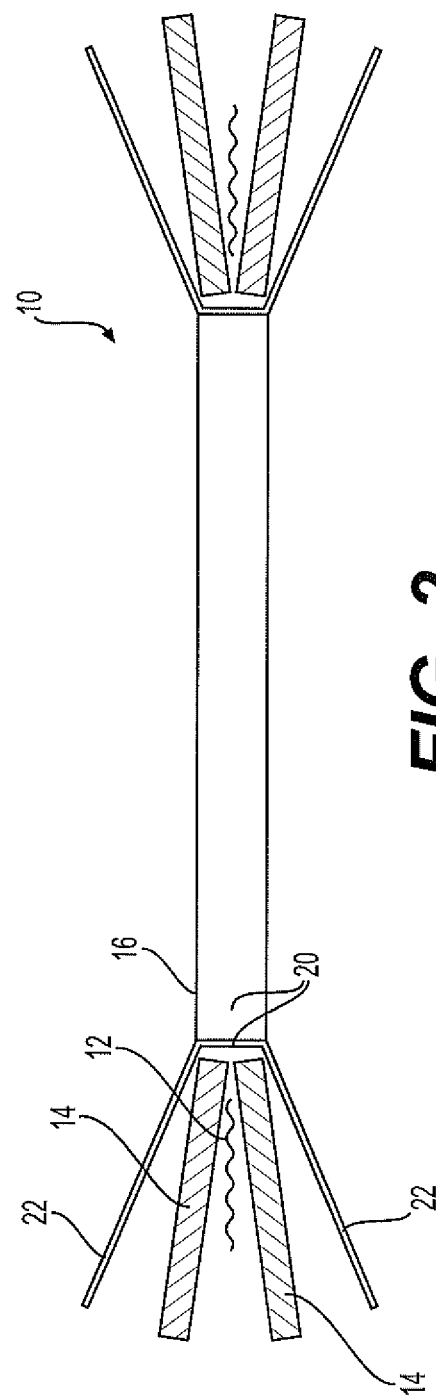
FIG. 2 is a side cross-sectional view of an assembled but not yet bonded example of an envelope gasket as described herein.

FIG. 2 is a side, cross-sectional view of the envelope gasket 10 in a loosely assembled condition. The PTFE outer shell 16 surrounds and envelopes the pair of filler material annular rings 14 and the interior-positioned corrugated metal annular ring insert 12. The outer shell 16 has a circular inside wall 20 and top and bottom flaps 22 that form its structure. The inside wall 20 defines the inside diameter of the overall gasket 10. The outer shell 16 is a monolithic, single piece of PTFE so that there should be no cracks or other gaps to allow process material to seep inside the gasket 10 from the inside diameter of the gasket.

Figure 3:
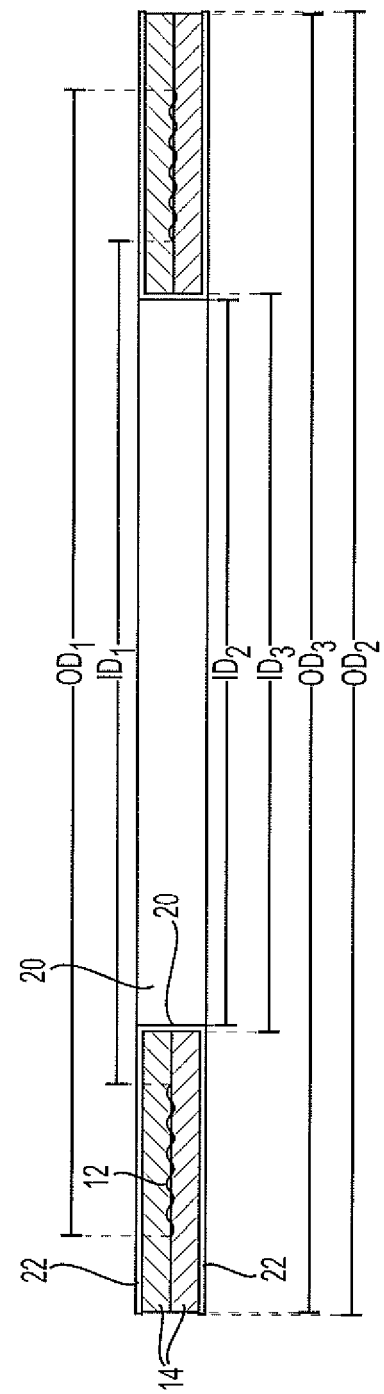
FIG. 3 is a side cross-sectional view of an envelope gasket as described herein.

FIG. 3 is a side, cross-sectional view of the assembled and fused together envelope gasket 10. The PTFE outer shell 16, comprised of an inside wall 20 and flaps 22 are fused to the filler material annular rings 14, which are in turn fused to the corrugated metal annular ring insert 12 in the middle between the filler material annular rings. The corrugated metal annular ring insert 12 has an inside diameter ID1 and an outside diameter OD1. The outer shell 16 has an inside diameter ID2 and an outside diameter OD2, The filler material insert rings 14 have an inside diameter ID3 and outside diameter OD3.

As shown in FIG. 3, the inside diameter ID3 of the filler material annular rings 14 is less that the inside diameter ID1 of the corrugated metal annular ring insert 12. Similarly, the outside diameter OD3 of the filler material annular rings 14 is greater than the outside diameter OD1 if the corrugated metal annular insert ring 12. In this way, the filler material annular rings 14 are able to fuse to each other and encapsulate the corrugated metal annular ring insert 12 in between those filler material annular rings. The inside diameter wall 20 of the outer shell 16 defines the inside diameter ID2 which is less than the ID3 of the filler material rings 14 and forms the inside diameter protective layer against any corrosive process material that comes into contact with it. The outside diameter OD2 of the outer shell 16 is similar to or slightly greater than as shown the outside diameter OD3 of the filler material annular rings 14. The OD2 may be greater or less than the OD3. Importantly, during the fusion process, the outer shell 16 becomes fused to the filler material annular rings 14 so that the entire envelope gasket 10 is sealed with no gaps or openings therein to allow outside corrosive materials into the inside of the gasket.

FIGS. 4 and 4A shows an alternative example of a gasket 30 having expanded/flexible graphite filler material rings 40. The gasket includes the outer shell 32 having an inside diameter wall 34 and flaps 36. The filler material rings of expanded graphite 40 encapsulate the corrugated metal ring 38. The outer shell 32 is bonded to the filler insert rings 40. So far, this is similar to the gasket 10 in FIGS. 2 and 3. However, in order to protect the exposed outside diameter of the filler insert rings 40. An ePTFE membrane tape 42 is wound around the outside diameter of the expanded graphite filler rings 40 and is bonded to both the outside diameter of the filler rings 40 but also the inside faces of the flaps 36 of the shell 32. The result is the complete encapsulation of the expanded graphite filler 40 inside an outer layer of ePTFE to prevent any potential for the expanded graphite to be contaminated.

EXAMPLES

The performance of gaskets as described herein has been compared with the performance of a traditional envelope gasket construction. Specifically, a gasket as described herein is formed from a bonded/fused virgin PTFE envelope, microcellular PTFE Filler rings, and a 316 Stainless Steel corrugated metal insert in the gasket that corresponded with American Society of Mechanical Engineers Standard B16.21 for Pipe Gaskets Nominal Pipe Size (NPS) 3, Pressure Class 150—Old Standard (ID: 3.000", OD: 5.375", Thickness: 0.250"). Another test gasket is identical to that described above, except that the filler rings were formed of expanded graphite material.

These gaskets were compared to the same size prior art envelope gasket that would otherwise be used in a similar application. This prior art gasket is formed from a loose, virgin PTFE envelope, Compressed Non-Asbestos (Compressed Fiber) filler rings, a 304 Stainless Steel corrugated metal insert in the gasket that corresponded with American Society of Mechanical Engineers Standard for Pipe Gaskets—Nominal Pipe Size (NPS) 3, Pressure Class 150—Old Standard (ID: 3.000", OD: 5.375", Thickness: 0.250"). The components are assembled loosely within the envelope and are not bonded or secured together.

These three gaskets were compared in a testing environment that is comparable to an ASTM F37 Sealability Fixture. The ASTM F37 Fixture uses testing methods to better analyze gaskets (made from sheet material or solid piece/ construction), the methods are suitable for evaluating the sealing characteristics of different gasket materials under various gasket stress and internal gas pressure(s) at room (ambient) temperature. They were also evaluated under ASTM F36 Testing conditions for Compressibility and Recovery at room temperature. With the information that both (ASTM F36 & F37) testing procedures provide, the gasket can be verified through industry test methods. Knowing the leak rate permits a user to choose the best (lowest leaking) gasket for the application. Having a gasket with high compressibility will allow the user to choose a gasket that will best conform to any damaged, wavy, or pitted flanges allowing for a better (tighter) seal. Gaskets with high recovery are ideal for thermal cycling services as they will act like a spring or live load ensuring that the bolted flange connection maintains adequate load on the gasket during compressive stress transients.

Additionally, these gaskets were compared under an industry test method for bolt load loss on a standard flange with load cells on each bolt. The fixture is torqued to the desired bolt pre-load (lbs) and the assembly is left at ambient temperature for a set amount of time with the bolt load (force) measured every hour. Gaskets with less creep (higher load retention) make for a more reliable bolted flanged connection.

Figure 5:
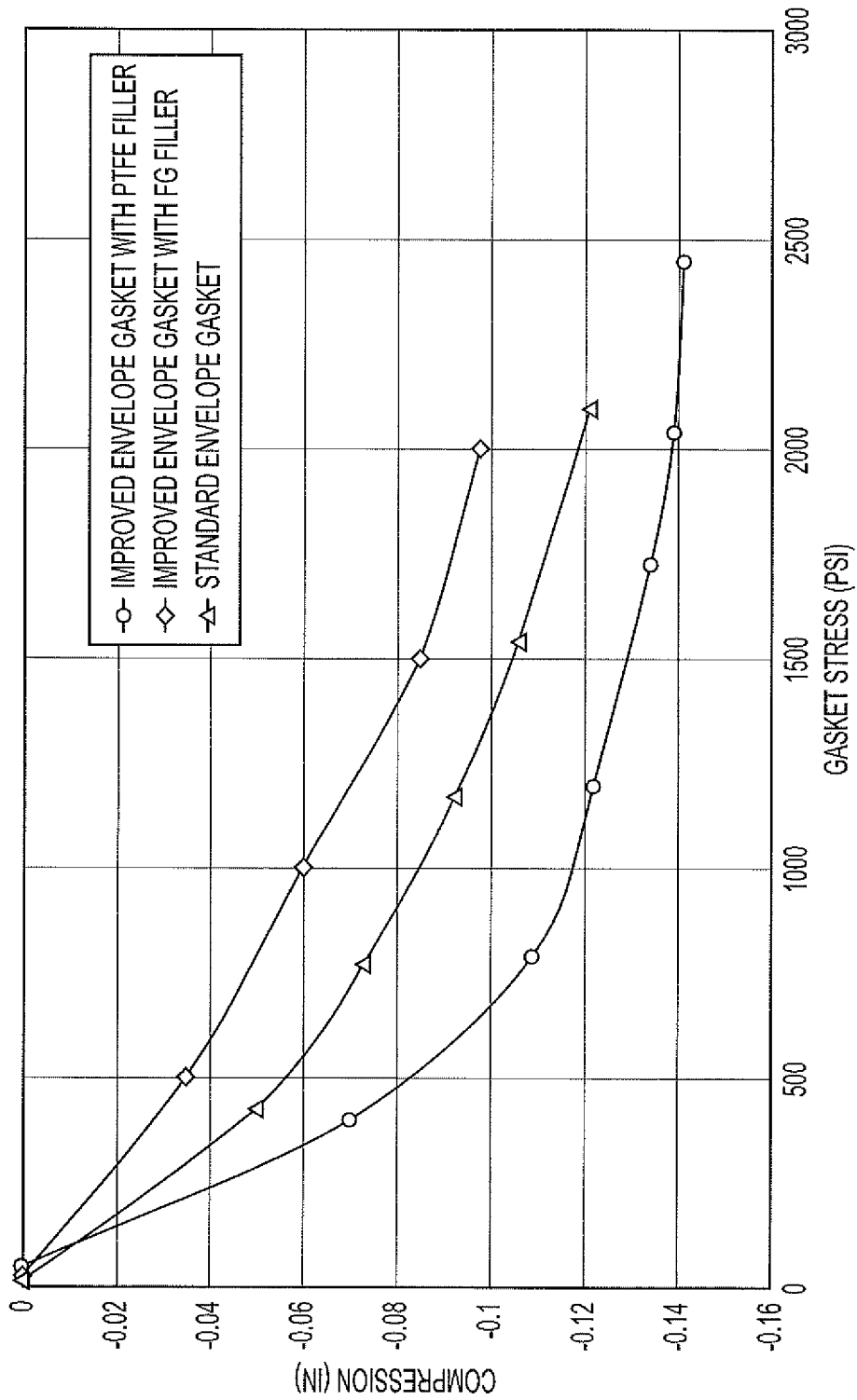
FIG. 5 is a graph showing comparative performance results in a compression test.

FIG. 5 is a graph measuring the compression performance of the respective gaskets. This graph covers the determination of the short-time compression at room temperature and represents the gaskets ability to conform to damaged or uneven surfaces (cuts, divots, pits, etc.). Increased compressibility can have a major effect on sealing performance. As seen in FIG. 5, the gasket made as described herein with PTFE filler material had higher compressibility (conform-ability) as compared to the existing prior art envelope gasket. The expanded graphite filler material version had lower compressibility as compared to the existing prior art envelope gasket; however, an expanded graphite filler material gasket is not engineered to be highly compressible. They are instead selected for higher load retention and higher service temperatures.

Figure 6:
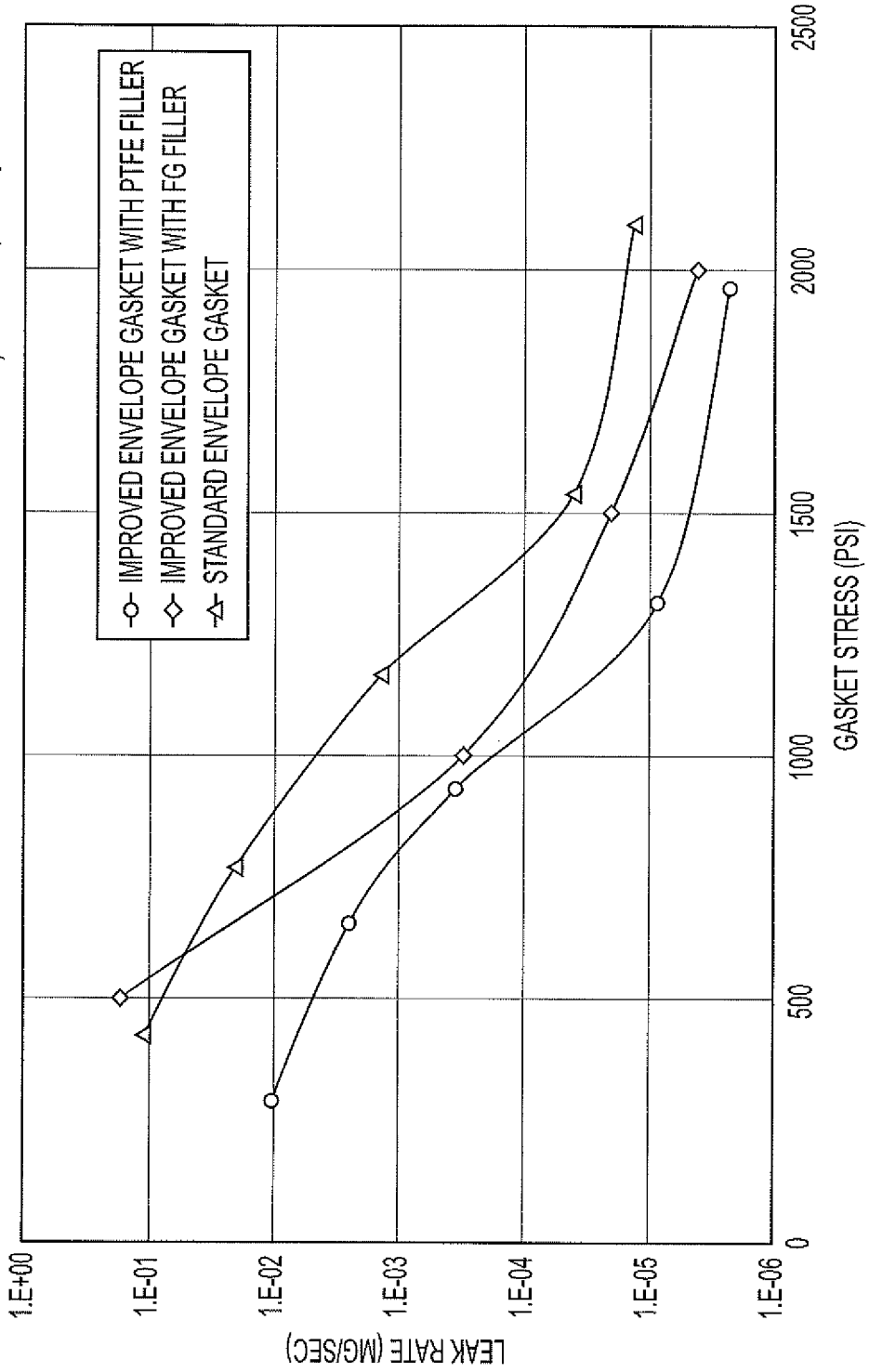
FIG. 6 is a graph showing comparative performance results in a leak rate test.

FIG. 6 is a graph plotting the performance results measuring leak rate of the respective gaskets. This graph represents the sealing characteristics of a gasket material under varying compressive loads/gasket stresses and compares gasket materials under controlled conditions while also providing a precise measure of leakage rate. A lower leak rate corresponds to a higher performing gasket, from a sealing standpoint. For this test, an internal pressure of 60 psig was used with a nitrogen test fluid. As seen in FIG. 6, the gasket made as described herein with both the PTFE filler material and expanded graphite filler material had exceptional sealability (Leak Rate) as compared to the existing prior art envelope gasket.

Figure 7:
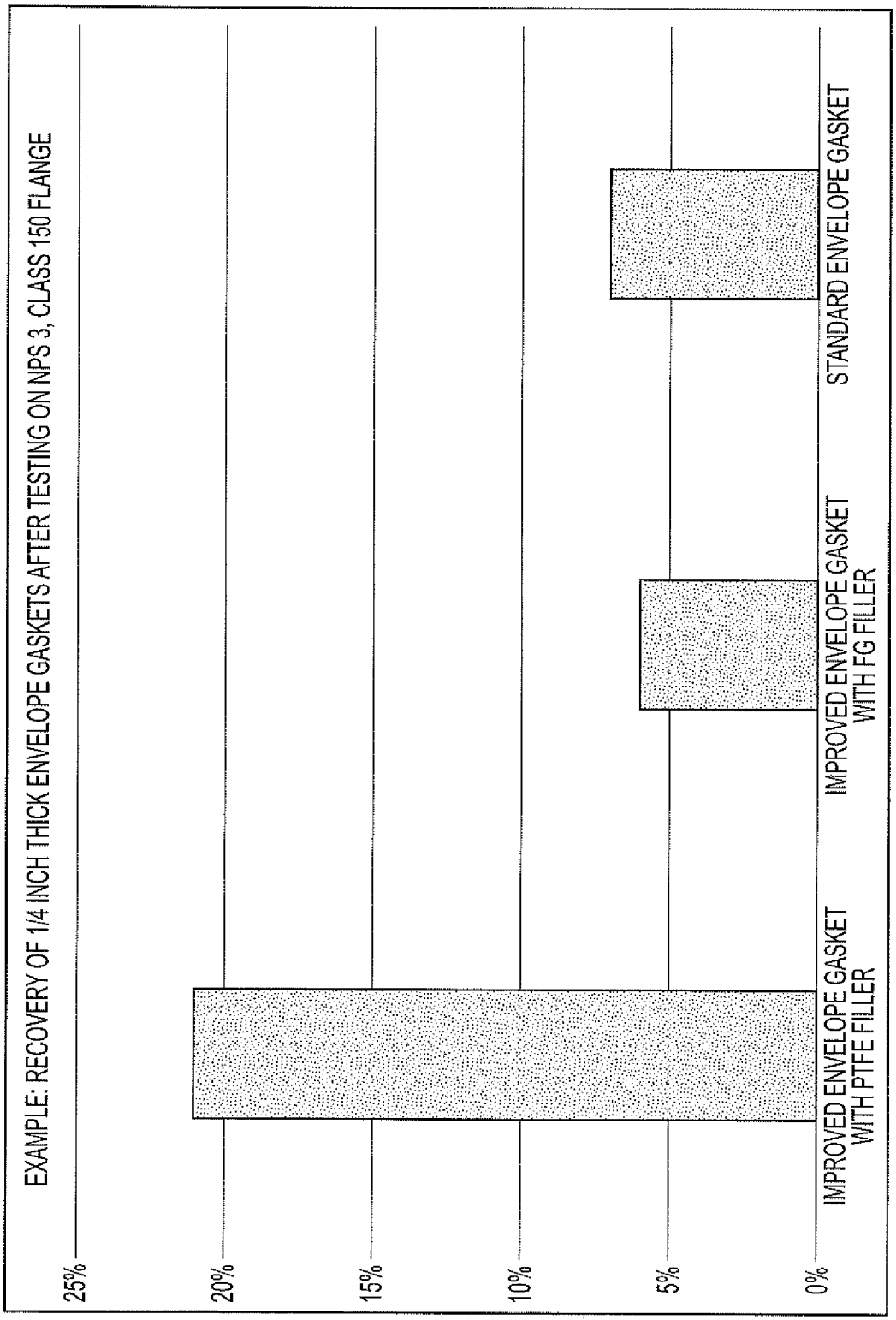
FIG. 7 is a graph showing comparative performance results in a recovery test.

FIG. 7 is a bar graph that illustrates the recovery of the respective envelope gaskets. This graph covers the determination of the short-time recovery at room temperature and represents the amount of recovery expected after a loading and unloading cycle. Increased recovery can greatly affect a bolted flanged connections reliability. As seen in FIG. 7, the gasket made as described herein with PTFE filler material had excellent recovery as compared to the existing prior art envelope gasket. The expanded graphite filler material version had a similar performance as compared to the existing prior art envelope gasket.

Figure 8:
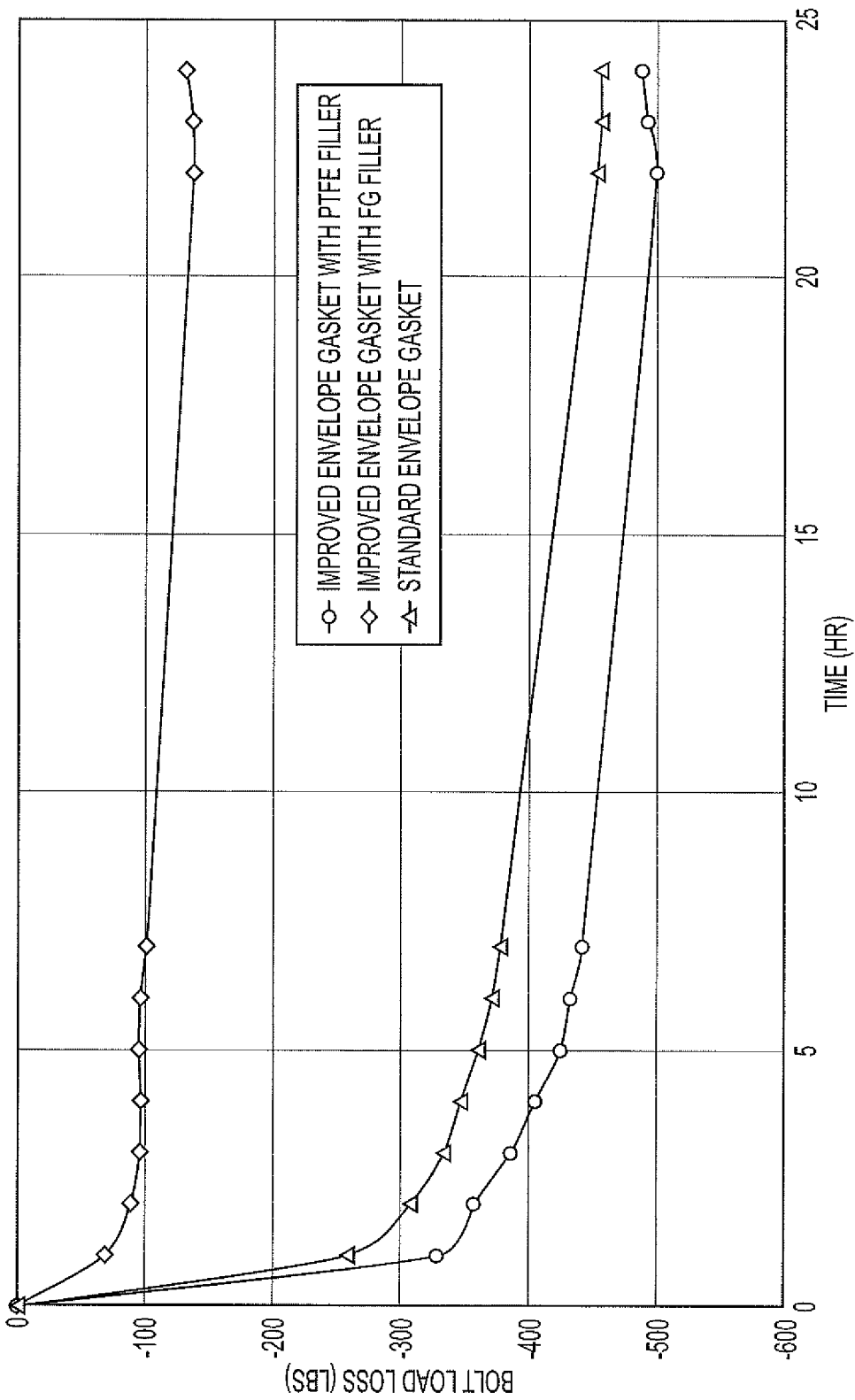
FIG. 8 is a graph showing comparative performance results in a bolt load loss test.

And FIG. 8 is a graph illustrating the bolt load loss performance of the respective gaskets. This graph characterizes the amount of bolt load loss (gasket creep/relaxation) for different gasket materials. In this example, the target bolt load was 5,500 lbs per bolt. This test compares related materials under controlled conditions and their ability to maintain a given bolt load as a function of time. As seen in FIG. 8, the gasket made as described herein with expanded graphite filler material had excellent Bolt Load Retention as compared to the existing prior art envelope gasket. The PTFE filler material version had a similar performance as compared to the existing prior art envelope gasket.

Other embodiments of the present invention will be apparent to those skilled in the art from consideration of the specification. It is intended that the specification and Figures be considered as exemplary only, with a true scope and spirit of the invention being indicated by the following claims.

That which is claimed is:

1. An envelope gasket for use in a corrosive process environment, the gasket comprising:
   a corrugated metal annular ring insert defining a first inside diameter and a first outside diameter;
   a polytetrafluorethylene outer shell in the shape of an annular ring, defining a second inside diameter and a second outside diameter, closed at the second inside diameter and open at the second outside diameter, wherein the second inside diameter is less than the first inside diameter, and the second outside diameter is greater than the first outside diameter;
   a pair of filler material annular rings, each defining a third inside diameter and a third outside diameter, wherein the third inside diameter is less than the first inside diameter, and the third outside diameter is greater than the first outside diameter, wherein the filler material annular rings are comprised of a material selected from the group consisting of microcellular PTFE, expanded PTFE, and filled PTFE;
   further wherein the filler material annular rings are positioned on a top and a bottom of the corrugated metal annular ring insert;
   further wherein the outer shell is positioned continuously around the filler rings and the first and third inside diameters and the first and third outside diameters;
   and the outer shell and the filler material annular rings are bonded to each other and the filler material annular rings are bonded to themselves at the inside of the first inside diameter and outside of the first outside diameters and the radial width of the filler material annular rings bond to each other from the first outside diameter to the second outside diameter is at least 21% of the radial width of the gasket between the second inside diameter and second outside diameter of the gasket, wherein the corrugated metal annular ring insert is encapsulated between the filler material annular rings so that the entire envelope gasket is sealed with no gaps or openings therein to allow outside corrosive materials into the inside of the gasket;
   and wherein the envelope gasket comprises no adhesive material between the outer shell, filler material and metal insert layers.

2. An envelope gasket as described in claim 1, wherein the outer shell is comprised of virgin polytetrafluoroethylene.

3. An envelope gasket as described in claim 1, wherein the overall thickness of the entire envelope gasket is between about 0.1 and 0.5 inches.

4. An envelope gasket as described in claim 1, wherein the overall thickness of the entire envelope gasket is between about 0.18 and 0.27 inches.

5. An envelope gasket as described in claim 1, wherein the filler material annular rings are comprised of expanded graphite, and the gasket further comprises at least one winding of an expanded PTFE tape around the third outside diameter of the expanded graphite filler material and having a width at least as wide as the distance between the outer shells at the second outside diameter of the gasket, and wherein the expanded PTFE tape is bonded to the outside shell of the gasket.

6. An envelope gasket as described in claim 5, wherein the gasket further comprises a plurality of windings of expanded PTFE tape around the third outside diameter of the expanded graphite filler material, and the windings are bonded to the inner faces of the outside shell of the gasket.

* * * * *